(12) United States Patent
Sankaran

(10) Patent No.: US 11,047,445 B2
(45) Date of Patent: Jun. 29, 2021

(54) DAMPER WITH DUAL PISTONS

(71) Applicant: Tenneco Automotive Operating Company Inc., Lake Forest, IL (US)

(72) Inventor: Shivanand Sankaran, Canton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 6 days.

(21) Appl. No.: 16/515,645

(22) Filed: Jul. 18, 2019

(65) Prior Publication Data

US 2021/0018059 A1    Jan. 21, 2021

(51) Int. Cl.
| | | |
|---|---|---|
| *F16F 9/32* | (2006.01) | |
| *F16F 9/49* | (2006.01) | |
| *B60G 13/08* | (2006.01) | |

(52) U.S. Cl.
CPC ............ *F16F 9/3214* (2013.01); *B60G 13/08* (2013.01); *F16F 9/49* (2013.01); *B60G 2206/41* (2013.01); *F16F 2230/42* (2013.01)

(58) Field of Classification Search
CPC .... F16F 9/49; F16F 9/185; F16F 9/516; F16F 9/585; F16F 9/3214; F16F 9/3271; F16F 9/3465; F16F 9/48; F16F 9/165; F16F 2228/066; F16F 2230/0023; F16F 2230/42; F16F 9/062; F16F 9/064; F16F 9/348; B60G 15/12; B60G 15/062; B60G 17/04; B60G 17/08; B60G 2200/142; B60G 2202/24; B60G 2202/312; B60G 2206/41; B60G 2500/10; B60G 2500/11; B60G 2800/162

USPC .......................................................... 188/266
See application file for complete search history.

(56) References Cited

U.S. PATENT DOCUMENTS

| | | | | |
|---|---|---|---|---|
| 5,157,806 | A | * | 10/1992 | Wartian ................... E05F 3/02 16/49 |
| 9,651,110 | B2 | | 5/2017 | Takeno et al. |
| 9,657,803 | B2 | | 5/2017 | Slusarczyk et al. |
| 10,107,352 | B2 | | 10/2018 | Grzesik et al. |
| 10,174,802 | B2 | | 1/2019 | Osika et al. |

(Continued)

FOREIGN PATENT DOCUMENTS

| | | |
|---|---|---|
| DE | 2118079 | 11/1972 |
| DE | 29923202 | 6/2000 |

(Continued)

*Primary Examiner* — Robert A. Siconolfi
*Assistant Examiner* — San M Aung
(74) *Attorney, Agent, or Firm* — McGarry Bair PC

(57) ABSTRACT

A damper includes a pressure tube defining a first end and a second end opposite to the first end. The pressure tube includes a primary section extending from the first end and a reduced-diameter section extending from the second end. The damper includes a primary piston slidably disposed within the pressure tube. The primary piston defines a rebound chamber and a compression chamber within the pressure tube. The damper further includes a secondary piston movable with the primary piston. The damper includes a sleeve connected to the pressure tube and surrounding the reduced-diameter section. The damper also includes a base valve. The pressure tube and the sleeve define an intermediate chamber therebetween. The pressure tube further defines at least one tube opening to fluidly communicate the compression chamber with the intermediate chamber.

15 Claims, 5 Drawing Sheets

(56) References Cited

U.S. PATENT DOCUMENTS

| | | | |
|---|---|---|---|
| 2015/0090548 A1 | 4/2015 | Yamanaka | |
| 2015/0330475 A1* | 11/2015 | Slusarczyk | F16F 9/49 188/288 |
| 2016/0223045 A1* | 8/2016 | Baldoni | B60G 15/062 |
| 2018/0058533 A1 | 3/2018 | Bruno et al. | |
| 2018/0094691 A1* | 4/2018 | Zhu | F16F 9/3271 |
| 2018/0119770 A1* | 5/2018 | Bruno | F16F 9/516 |
| 2018/0195574 A1 | 7/2018 | Ishimaru et al. | |
| 2018/0223941 A1 | 8/2018 | Grzesik et al. | |

FOREIGN PATENT DOCUMENTS

| | | |
|---|---|---|
| DE | 102015106709 | 11/2016 |
| JP | 2004028167 | 1/2004 |

* cited by examiner

DAMPER WITH DUAL PISTONS

TECHNICAL FIELD

The present disclosure generally relates to dampers. More particularly, the present disclosure relates to a damper having dual pistons.

BACKGROUND

Shock absorbers/dampers are generally installed on different types of equipment, such as vehicles, to damp vibrations during operation. For example, dampers are generally connected between a body and the suspension system of the vehicle in order to absorb the vibrations. Conventional dampers typically include a pressure tube, a reserve tube, a piston assembly, a piston rod, and one or more valves. During a compression stroke and a rebound stroke of the damper, the piston assembly may limit a flow of damping fluid between working chambers defined within a body of the damper due to which the damper produces a damping force which counteracts the vibrations. By further restricting the flow of damping fluid within the working chambers of the damper, greater damping forces may be generated by the damper.

Typically, a damper for a vehicle suspension is provided with a hydraulic compression end stop (HCS) member. In conventional HCS designs, a cup is press-fitted inside the pressure tube. Press-fitting of the cup may be difficult to perform due to close tolerances between the damper components. Other methods of coupling the cup inside the pressure tube, such as welding, may be complex as it is difficult to reach down and weld a top of the cup to the pressure tube.

SUMMARY

In an aspect of the present disclosure, a damper is provided. The damper includes a pressure tube defining a first end and a second end opposite to the first end. The pressure tube includes a primary section extending from the first end and a reduced-diameter section extending from the second end. A diameter of the reduced-diameter section is less than a diameter of the primary section. The damper also includes a primary piston slidably disposed within the pressure tube. The primary piston defines a rebound chamber and a compression chamber within the pressure tube. The damper further includes a secondary piston movable with the primary piston. A diameter of the secondary piston is less than a diameter of the primary piston. The secondary piston is slidable within the reduced-diameter section. The damper further includes a sleeve connected to the pressure tube and surrounding the reduced-diameter section. The sleeve defines a first sleeve end disposed proximal to the pressure tube and a second sleeve end opposite to the first sleeve end. The damper also includes a base valve disposed at the second sleeve end. The pressure tube and the sleeve define an intermediate chamber therebetween. The pressure tube further defines at least one tube opening to fluidly communicate the compression chamber with the intermediate chamber.

In another aspect of the present disclosure, a damper is provided. The damper includes a pressure tube defining a first end and a second end opposite to the first end. The pressure tube includes a primary section extending from the first end, a reduced-diameter section extending from the second end, and a tapered section disposed between the primary section and the reduced-diameter section. A diameter of the reduced-diameter section is less than a diameter of the primary section. The damper also includes a primary piston slidably disposed within the pressure tube. The primary piston defines a rebound chamber and a compression chamber within the pressure tube. The damper further includes a secondary piston movable with the primary piston. A diameter of the secondary piston is less than a diameter of the primary piston. The secondary piston is slidable within the reduced-diameter section. The damper further includes a sleeve connected to the pressure tube and surrounding the reduced-diameter section. The sleeve defines a first sleeve end disposed proximal to the pressure tube and a second sleeve end opposite to the first sleeve end. The damper also includes a base valve disposed at the second sleeve end. The pressure tube and the sleeve define an intermediate chamber therebetween. Further, at least one of the reduced-diameter section and the tapered section of the pressure tube defines at least one tube opening to fluidly communicate the compression chamber with the intermediate chamber.

In yet another aspect of the present disclosure, a damper is provided. The damper includes a pressure tube defining a first end and a second end opposite to the first end. The pressure tube includes a primary section extending from the first end and a reduced-diameter section extending from the second end. A diameter of the reduced-diameter section is less than a diameter of the primary section. The damper also includes a primary piston slidably disposed within the pressure tube. The primary piston defines a rebound chamber and a compression chamber within the pressure tube. The damper further includes a secondary piston movable with the primary piston. A diameter of the secondary piston is less than a diameter of the primary piston. The secondary piston is slidable within the reduced-diameter section. The damper further includes a sleeve connected to the pressure tube and surrounding the reduced-diameter section. The sleeve defines a first sleeve end disposed proximal to the pressure tube and a second sleeve end opposite to the first sleeve end. The damper also includes a base valve disposed at the second sleeve end. The pressure tube and the sleeve define an intermediate chamber therebetween. The pressure tube further defines at least one tube opening at the second end to fluidly communicate the compression chamber with the intermediate chamber.

Other features and aspects of this disclosure will be apparent from the following description and the accompanying drawings.

DETAILED DESCRIPTION

Wherever possible, the same reference numbers will be used throughout the drawings to refer to same or like parts.

Figure 1:
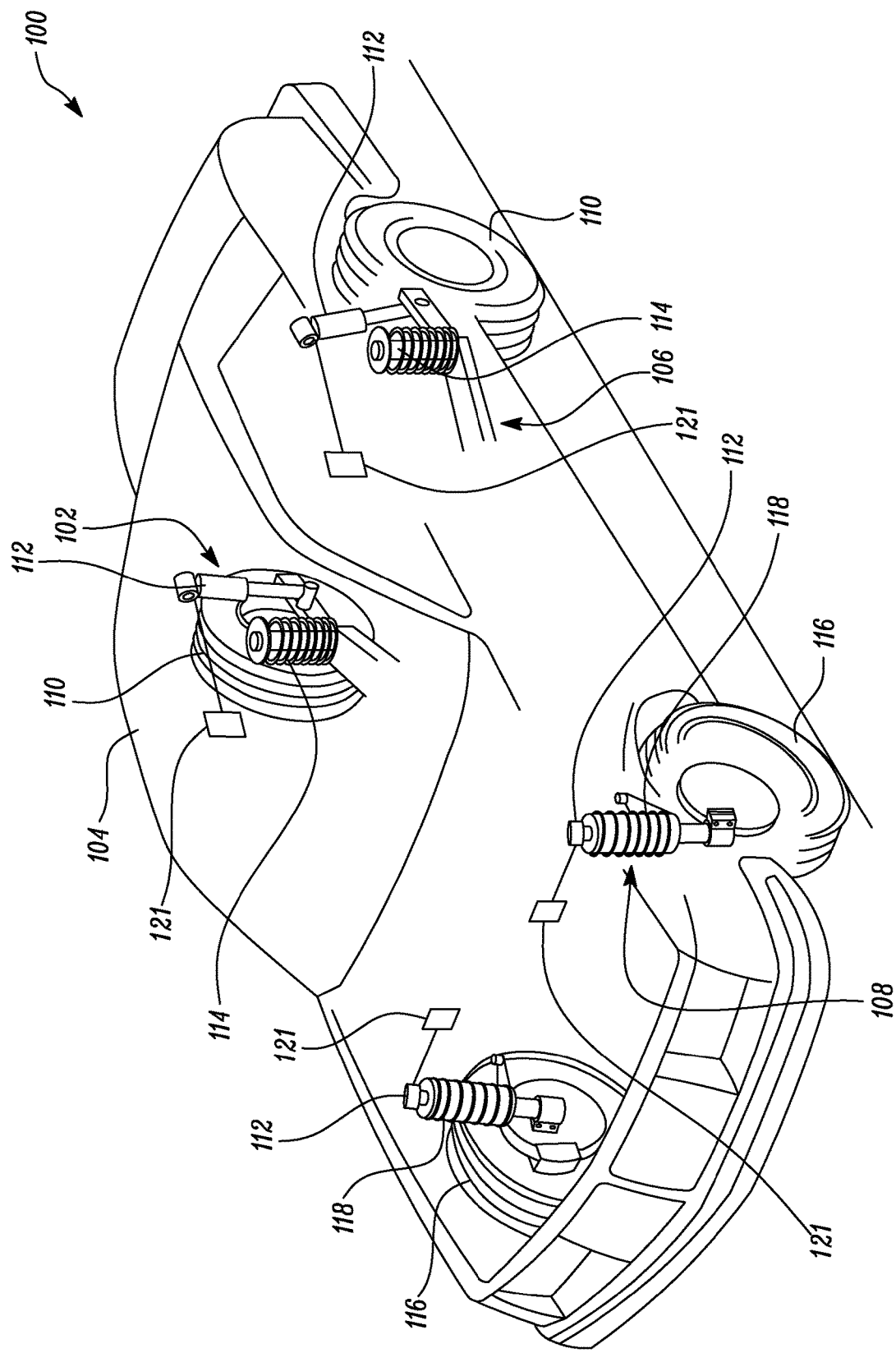
FIG. 1 is an illustration of a vehicle incorporating a suspension system, according to an aspect of the present disclosure.

FIG. 1 illustrates an exemplary vehicle 100 incorporating a suspension system 102 in accordance with the present disclosure. The vehicle 100 may include a vehicle driven by an internal combustion engine, an electric vehicle, or a hybrid vehicle. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) which operatively supports a pair of front wheels 116. The front axle assembly is operatively connected to the body 104 by means of another pair of the dampers 112 and a pair of helical coil springs 118. In an alternative embodiment, the vehicle 100 may include an independent suspension unit (not shown) for each of the four corners instead of front and rear axle assemblies.

The dampers 112 of the suspension system 102 serve to damp the relative movement of the unsprung portion (i.e., the front and rear suspensions 108, 106) and the sprung portion (i.e., the body 104) of the vehicle 100. While the vehicle 100 has been depicted as a passenger car, the dampers 112 may be used with other types of vehicles or any equipment that requires damping. Examples of vehicles include buses, trucks, off-road vehicles, and so forth. Furthermore, the term "damper 112" as used herein will refer to dampers in general and will include shock absorbers, McPherson struts, and semi-active and active suspensions.

In order to automatically adjust each of the dampers 112, an electronic controller 121 is electrically connected to the dampers 112. The controller 121 is used for controlling an operation of each of the dampers 112 in order to provide appropriate damping characteristics resulting from movements of the body 104 of the vehicle 100. Further, the controller 121 may independently control each of the dampers 112 in order to independently control a damping level of each of the dampers 112. The controller 121 may be electrically connected to the dampers 112 via wired connections, wireless connections, or a combination thereof. In examples, each of the dampers 112 may include a dedicated electronic controller 121 that may be located onboard the respective damper 112. Further, the functionalities of the controller 121 may be performed by an Electronic Control Unit (ECU) of the vehicle 100.

The controller 121 may independently adjust the damping level or characteristic of each of the dampers 112 to optimize a riding performance of the vehicle 100. The term "damping level", as used herein, refers to a damping force produced by each of the dampers 112 to counteract movements or vibrations of the body 104. A higher damping level may correspond to a higher damping force. Similarly, a lower damping level may correspond to a lower damping force. Such adjustments of the damping levels may be beneficial during braking and turning of the vehicle 100. The controller 121 may include a processor, a memory, Input/Output (I/O) interfaces, communication interfaces, and other components. The processor may execute various instructions stored in the memory for carrying out various operations of the controller 121. The controller 121 may receive and transmit signals and data through the I/O interfaces and the communication interfaces. In further embodiments, the controller 121 may include microcontrollers, application-specific integrated circuits (ASICs), field programmable gate arrays (FPGAs), and so forth.

Figure 2:
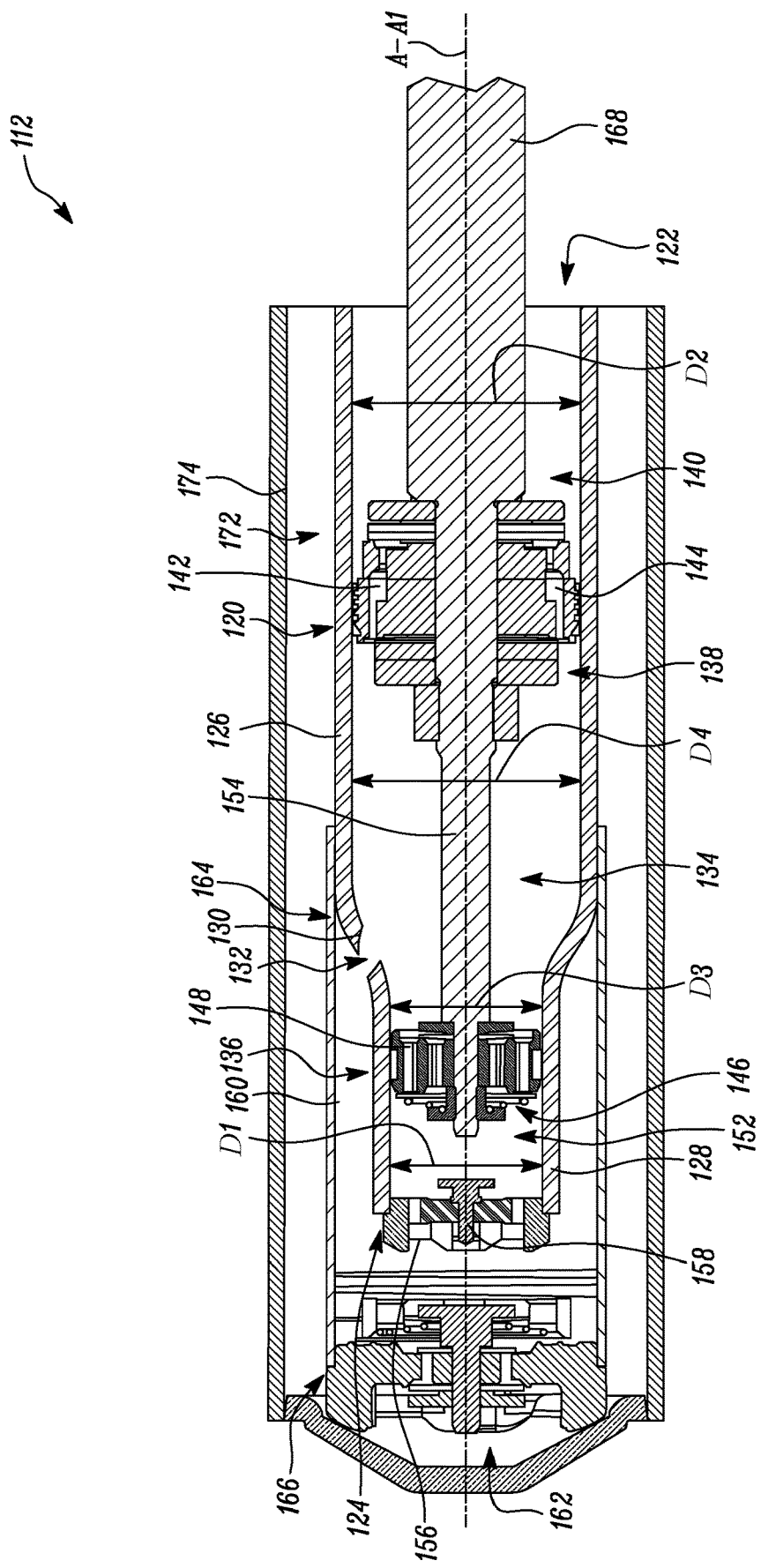
FIG. 2 is a schematic illustration of a damper associated with the suspension system of FIG. 1, according to an aspect of the present disclosure.

FIG. 2 illustrates a schematic view of the damper 112. The damper 112 may be any of the four dampers 112 of the vehicle 100. The damper 112 may include a Continuously Variable Semi-Active Suspension system (CVSA2) damper 112 or a shock absorber, without any limitations. The damper 112 may contain a fluid which can be a hydraulic fluid or oil. The damper 112 includes a pressure tube 120 defining a first end 122 and a second end 124 opposite to the first end 122. The pressure tube 120 is embodied as a monolithic pressure tube. The pressure tube 120 may be further embodied as a substantially cylindrical tube with open ends. The pressure tube 120 defines a longitudinal axis "A-A1". The pressure tube 120 includes a primary section 126 extending from the first end 122 and a reduced-diameter section 128 extending from the second end 124. A diameter "D1" of the reduced-diameter section 128 is less than a diameter "D2" of the primary section 126. The reduced-diameter section 128 has a uniform diameter along the longitudinal axis "A-A1". In an example, the reduced-diameter section 128 performs the function of a hydraulic compression end stop (HCS) cup.

Further, the pressure tube 120 includes a tapered section 130 disposed between the primary section 126 and the reduced-diameter section 128. The tapered section 130 connects the primary section 126 with the reduced-diameter section 128. In the illustrated example, the tapered section 130 has a curved profile. Alternatively, the tapered section 130 may include a linear profile. The tapered section 130 and the reduced-diameter section 128 may be formed by various methods, such as necking of a tube having a substantially uniform diameter. In some other embodiments, the pressure tube 120 may have a stepped configuration (not shown) without any taper in order to define the reduced-diameter section 128. Further, the pressure tube 120 defines at least one tube opening 132 that allows fluid communication between a compression chamber 134 and an intermediate chamber 136. The compression and intermediate chambers 134, 136 will be explained later in this section.

Figure 4:
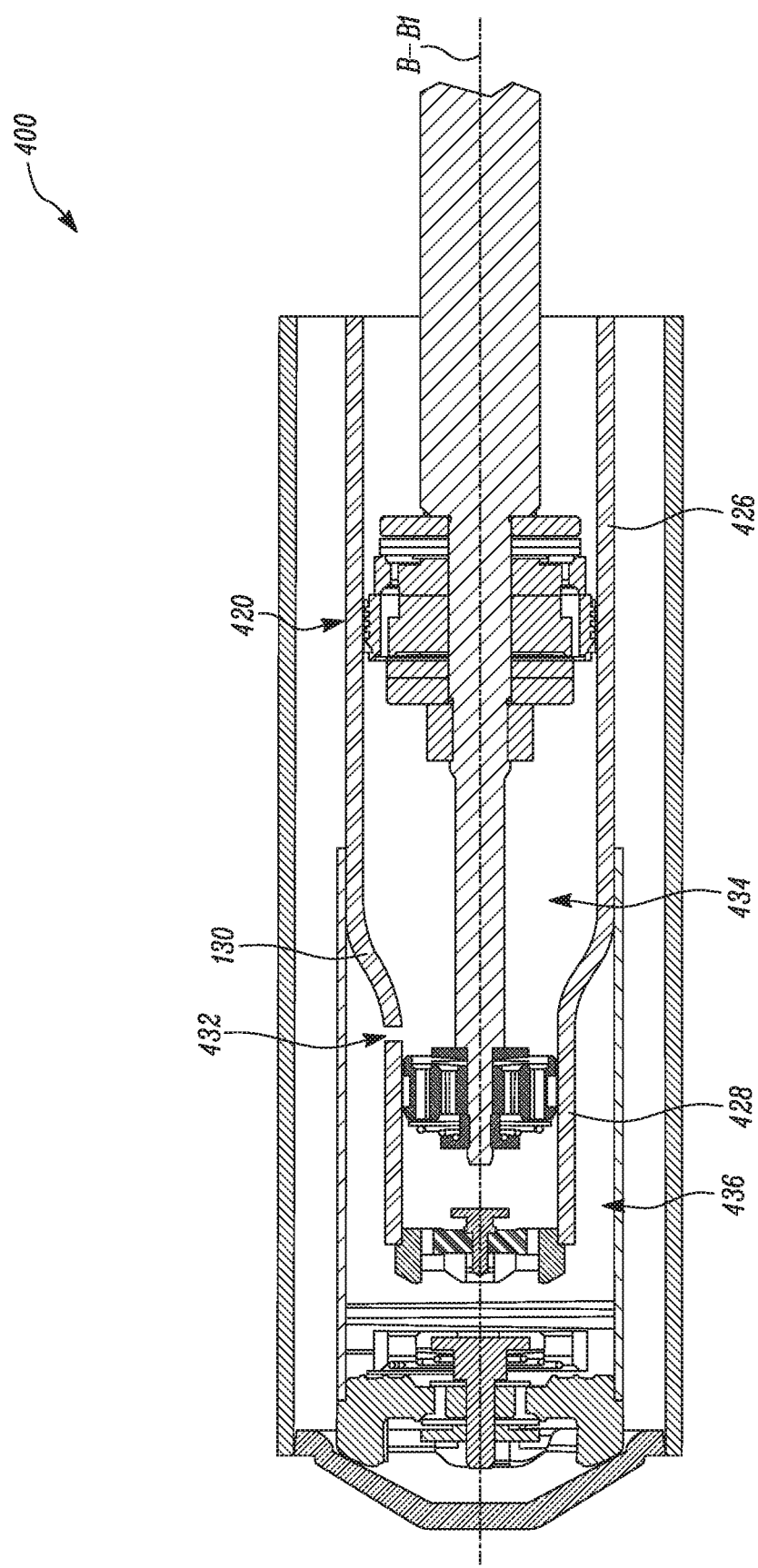
FIG. 4 is a schematic illustration of another design of a damper having a tube opening provided in a reduced-diameter section of the damper, according to an aspect of the present disclosure.
Figure 5:
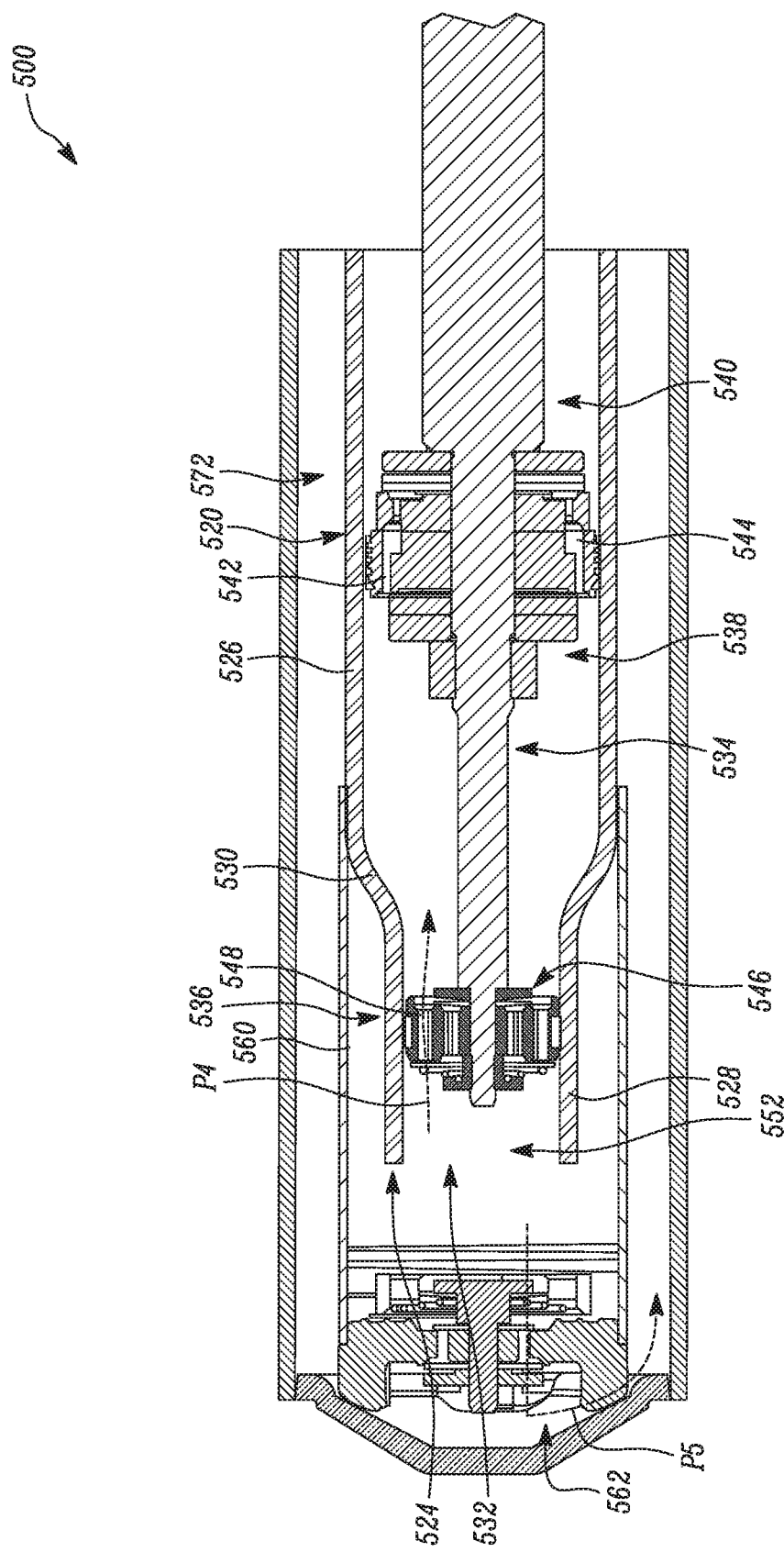
FIG. 5 is a schematic illustration of yet another design of a damper depicting fluid flow during a compression stroke of the damper, according to an aspect of the present disclosure.

In the illustrated example, the at least one tube opening 132 is disposed in the tapered section 130. Alternatively, the tube opening 132 may be provided in the reduced-diameter section 128. For example, the tube opening 132 may be provided in the reduced-diameter section 128 such that the tube opening 132 is disposed adjacent to the tapered section 130 (as shown in FIG. 4). In another example, the tube opening 132 may be provided in the reduced-diameter section 128 such that the tube opening 132 is disposed at the second end 124 of the pressure tube 120 (as shown in FIG. 5). The damper 112 illustrated herein includes a single tube opening 132. However, the damper 112 may include multiple tube openings provided on the pressure tube 120, based on application requirements. The multiple tube openings may be radially and/or axially spaced part from each other.

Figure 3:
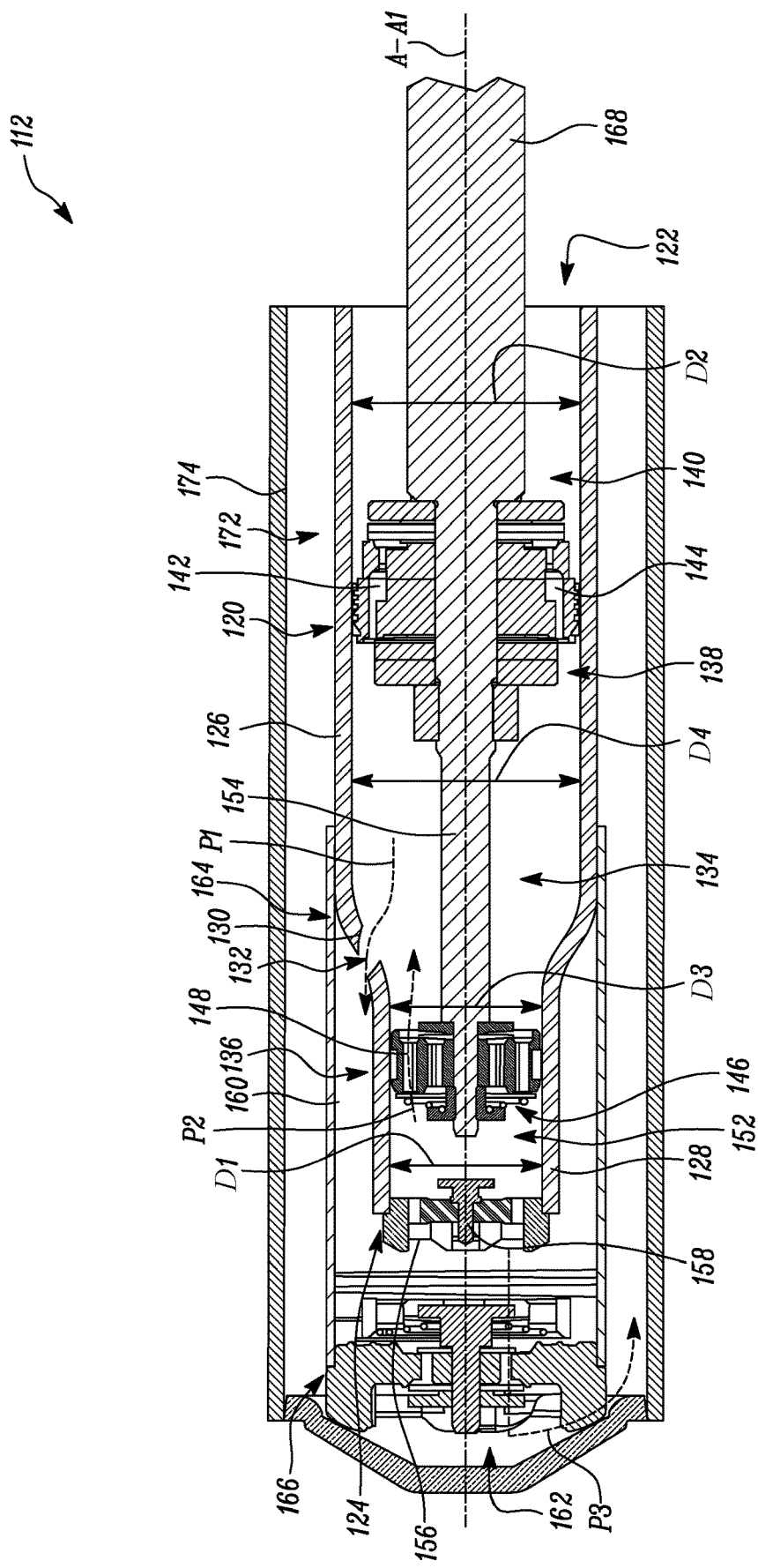
FIG. 3 is an illustration of the damper shown in FIG. 2 depicting fluid flow during a compression stroke of the damper.

Referring to FIG. 3, a primary piston 138 is slidably disposed within the pressure tube 120. The primary piston 138 defines a rebound chamber 140 and the compression chamber 134 within the pressure tube 120. Each of the rebound and compressions chambers 140, 134 contain the fluid therein. A volume of each of the rebound and compression chambers 140, 134 varies based on a reciprocating motion of the primary piston 138. Additionally, a pair of primary piston valves 142, 144 may be disposed within the primary piston 138 to regulate fluid flow between the rebound and compressions chambers 140, 134. More particularly, the first and second primary piston valves 142, 144 may maintain desired pressures in each of the rebound and compressions chambers 140, 134. In an embodiment, the first primary piston valve 142 operates in an open position during a rebound stroke and is in a closed position during a compression stroke. Further, the second primary piston valve 144 operates in an open position during the compression stroke and is in a closed position during the rebound stroke.

In an example, the first and second primary piston valves 142, 144 may be embodied as unidirectional valves, such as non-return valves. The first and second primary piston valves 142, 144 may therefore include check valves. Alternatively, the first and second primary piston valves 142, 144 may include variable flow control valves, without any limitations. Further, the primary piston 138 is connected to the body 104 of the vehicle 100 by a rod member 168, a portion of which is received within the rebound chamber 140.

The damper 112 also includes a secondary piston 146 movable with the primary piston 138. The secondary piston 146 may be embodied as an HCS piston and assists in providing additional damping forces. A diameter "D3" of the secondary piston 146 is less than a diameter "D4" of the primary piston 138. The diameter "D4" is substantially equal to the diameter "D2" of the primary section 126. Further, the secondary piston 146 is slidable within the reduced-diameter section 128. More particularly, as the diameter "D3" is substantially equal to the diameter "D1" of the reduced-diameter section 128, the secondary piston 146 can be accommodated within the reduced-diameter section 128. Therefore, the secondary piston 146 can reciprocate within the reduced-diameter section 128.

Additionally, the damper 112 includes a secondary piston valve 148 disposed in the secondary piston 146. The secondary piston valve 148 is disposed within the secondary piston 146 to regulate fluid flow between the compression chamber 134 and an additional chamber 152. More particularly, the secondary piston valve 148 may maintain a desired pressure in each of the compression chamber 134 and the additional chamber 152. The secondary piston valve 148 may operate in an open position during the compression stroke and may be in a closed position during the rebound stroke. In another example, the secondary piston 146 may include an additional secondary piston valve disposed within the secondary piston 146 to regulate fluid flow between the compression chamber 134 and the additional chamber 152 during the rebound stroke. In an example, the secondary piston valve 148 may be embodied as a unidirectional valve, such as a non-return valve. The secondary piston valve 148 may therefore include a check valve. Alternatively, the secondary piston valve 148 may include a variable flow control valve, without any limitations.

Further, the damper 112 includes an elongate post 154 connecting the primary piston 138 to the secondary piston 146. An end of the elongate post 154 is connected to the primary piston 138 whereas another end of the elongate post 154 is connected to the secondary piston 146. The elongate post 154 is disposed within the compression chamber 134 and reciprocates with the primary and secondary pistons 138, 146. The elongate post 154 may have a substantially cylindrical shape.

Additionally, a plug 156 is disposed at the second end 124 of the pressure tube 120. The plug 156 may close the second end 124 of the pressure tube 120. In an example, the plug 156 is welded to the second end 124 to enclose the additional chamber 152 defined at the reduced-diameter section 128. Further, the additional chamber 152 is defined between the secondary piston 146 and the plug 156. During the compression stroke of the damper 112, a portion of the fluid from the additional chamber 152 enters into the compression chamber 134. Further, the plug 156 includes a plug valve 158. In alternative embodiments, the plug 156 may not include any valve. The plug valve 158 may operate in an open position during the compression stroke and may be in a closed position during the rebound stroke of the damper 112.

During the compression stroke of the damper 112, the plug valve 158 provides fluid communication between the additional chamber 152 and the intermediate chamber 136. In another example, an additional plug valve may be disposed within the plug 156 to regulate fluid flow between the additional chamber 152 and the intermediate chamber 136 during the rebound stroke. In an example, the plug valve 158 may be embodied as a unidirectional valve, such as a non-return valve. The plug valve 158 may therefore include a check valve. Alternatively, the plug valve 158 may include a variable flow control valve, without any limitations. It should be noted that the damper 112 includes the plug valve 158 and the secondary piston valve 148 for increased tunability. However, it may be contemplated that the damper 112 includes any one of plug valve 158 and the secondary piston valve 148.

The damper 112 also includes a sleeve 160. The sleeve 160 is connected to the pressure tube 120 and surrounds the reduced-diameter section 128. The sleeve 160 forms a fluid passageway from the compression chamber 134 towards a base valve 162. The sleeve 160 may be embodied as a substantially cylindrical tube with open ends. The sleeve 160 may be made of a metal, an alloy, a composite, or a plastic. The sleeve 160 defines a first sleeve end 164 disposed proximal to the pressure tube 120 and a second sleeve end 166 opposite to the first sleeve end 164. Further, the sleeve 160 is connected to the primary section 126 of the pressure tube 120 adjacent to the tapered section 130. The pressure tube 120 and the sleeve 160 define the intermediate chamber 136 therebetween. In an example, the sleeve 160 is connected to the pressure tube 120 by welding to provide the intermediate chamber 136. In one example, the sleeve 160 is connected to the pressure tube 120 by capacitive discharge (CD) welding. The intermediate chamber 136 may be embodied as an HCS compression chamber. In some embodiments, a seal (not shown) may be provided between the sleeve 160 and the pressure tube 120.

Further, the base valve 162 is disposed at the second sleeve end 166. The base valve 162 may close the second sleeve end 166 of the sleeve 160. The base valve 162 may operate in an open position during the compression stroke and may be in a closed position during the rebound stroke. In the open position, the base valve 162 allows fluid flow from the intermediate chamber 136 towards the reserve chamber 172. In another example, the damper 112 may include an additional base valve disposed to regulate fluid flow between the intermediate chamber 136 and the reserve chamber 172 during the rebound stroke. For example, the base valve 162 may include an assembly of valves. More particularly, the base valve 162 may include a pair of unidirectional valves, such as non-return valves, that are operational during the rebound stroke and the compression stroke, respectively. The base valve 162 may therefore include a pair of check valves. Further, the base valve 162 may include a pair of variable flow control valves that are operational during the rebound stroke and the compression stroke, respectively.

In some embodiments, one or more of the primary piston valves 142, 144, the secondary piston valve 148, the base valve 162, and the plug valve 158 may be embodied as electro-hydraulic valves. In one example, at least one of the primary piston valves 142, 144, the secondary piston valve 148, the base valve 162, and the plug valve 158 may be a continuously variable solenoid valve. Further, at least one of the primary piston valves 142, 144, the secondary piston valve 148, the base valve 162, and the plug valve 158 may be electronically controlled by the controller 121 such that the controller 121 may regulate the primary piston valves 142, 144, the secondary piston valve 148, the base valve 162, and/or the plug valve 158 in order to control the damping level of the damper 112.

The damper 112 also includes a reserve tube 174 disposed around the pressure tube 120 and the sleeve 160. In some embodiments, the reserve tube 174 is concentrically disposed around the pressure tube 120 and the sleeve 160. The reserve tube 174 defines the reserve chamber 172. The reserve chamber 172 is disposed between the pressure tube 120 and the reserve tube 174. The reserve chamber 172 receives the fluid during the compression stroke of the damper 112.

During the rebound stroke, the primary and secondary pistons 138, 146 travel towards the first end 122. As the primary and secondary pistons 138, 146 travel towards the first end 122, the volume of the compression chamber 134 increases. Thus, an additional flow of fluid is directed to the compression chamber 134 to compensate for the increase in the volume of the compression chamber 134. As the volume of the rebound chamber 140 decreases, some amount of the fluid from the rebound chamber 140 flows towards the compression chamber 134. More particularly, based on the movement of the primary and secondary pistons 138, 146 towards the first end 122, a small portion of the fluid in the rebound chamber 140 may flow from the rebound chamber 140 towards the compression chamber 134 via the first primary piston valve 142. The first primary piston valve 142 is in the open position during the rebound stroke of the damper 112 to control rebound damping characteristics of the damper 112. In some examples, a degree of opening of the first primary piston valve 142 may be regulated to adjust the rebound damping characteristics of the damper 112. Further, during the rebound stroke, the second primary piston valve 144 is operable to prevent fluid flow therethrough in response to the motion of the primary and secondary pistons 138, 146 towards the first end 122. More particularly, the second primary piston valve 144 is in the closed position during the rebound stroke of the damper 112.

The damper 112 may further include a valve assembly (not shown) that provides fluid communication between the reserve chamber 172 and an external fluid reservoir (not shown), such as an accumulator. In such examples, the valve assembly may regulate a flow of fluid between the reserve chamber 172 and the external fluid reservoir. The valve assembly may be electronically controlled by the controller 121.

The compression chamber 134 may also receive a small portion of the fluid from the rebound chamber 140 through the first primary piston valve 142 and from the intermediate chamber 136 through the tube opening 132. More particularly, the fluid present in the intermediate chamber 136 may flow towards the compression chamber 134 via the tube opening 132. In some examples, fluid from the reserve chamber 172 may flow towards the intermediate chamber 136 via the base valve 162. A portion of this fluid may be further directed towards the compression chamber 134 via the tube opening 132.

During the compression stroke, when the primary and secondary pistons 138, 146 travel towards the second end 124, the volume of the rebound chamber 140 increases, whereas the volume of the compression chamber 134 and the additional chamber 152 decreases. More particularly, as the primary and secondary pistons 138, 146 travel towards the second end 124 and the secondary piston 146 enters the reduced-diameter section 128, the compression chamber 134 is defined partially by the primary section 126 and partially by the reduced-diameter section 128. Further, during the compression stroke, a small portion of the fluid from the compression chamber 134 may enter into the rebound chamber 140 via the second primary piston valve 144 to regulate pressure in the rebound chamber 140. In some examples, a degree of opening of the second primary piston valve 144 may be regulated to adjust the compression damping characteristics of the damper 112.

Additionally, the volume of the compression chamber 134 decreases as the primary and secondary pistons 138, 146 move towards the second end 124. Thus, fluid from the compression chamber 134 is directed towards the intermediate chamber 136 via the tube opening 132 and is then introduced in the reserve chamber 172 via the base valve 162. Path "P1" depicts the fluid flow from the compression chamber 134 towards the intermediate chamber 136.

Further, a volume of the additional chamber 152 also decreases as the secondary piston 146 enters the narrow section 128. Thus, during the compression stroke, the plug valve 158 operates in the open position to allow fluid flow from the additional chamber 152 towards the intermediate chamber 136 in response to the motion of the primary and secondary pistons 138, 146 towards the second end 124. Path "P2" depicts the fluid flow from the additional chamber 152 towards the intermediate chamber 136. Further, the base valve 162 is in the open position to allow a portion of the fluid to flow from the intermediate chamber 136 towards the reserve chamber 172. Path "P3" depicts the fluid flow from the intermediate chamber 136 towards the reserve chamber 172. In some examples, a degree of opening of the base valve 162 may be regulated to adjust the compression damping characteristics of the damper 112.

FIG. 4 illustrates another design of a damper 400. Components and working of the damper 400 are substantially similar to components and working of the damper 112 described in FIGS. 2 and 3. The damper 400 includes a pressure tube 420 similar to the pressure tube 120 of the damper 112. The pressure tube 420 includes a primary section 426, a reduced-diameter section 428, and a tapered section 430. Further, the pressure tube 420 includes at least one tube opening 432 that allows fluid communication between a compression chamber 434 with an intermediate chamber 436.

In the illustrated example, the at least one tube opening 432 is disposed in the reduced-diameter section 428. The tube opening 432 is disposed adjacent to the tapered section 430. The damper 400 illustrated herein includes a single tube opening 432. However, the damper 400 may include multiple tube openings provided in the pressure tube 420, based on application requirements. The multiple tube openings may be radially and/or axially spaced part from each other. A working of the damper 400 during rebound and compression strokes is similar to the working of the damper 112 during the rebound and compression strokes.

FIG. 5 illustrates yet another design of a damper 500. Components and working of the damper 500 are substantially similar to the components and working of the damper 112 described in FIGS. 2 and 3. The damper 500 includes a pressure tube 520, a primary section 526, and a reduced-diameter section 528 similar to the pressure tube 120, the primary section 126, and the reduced-diameter section 128 of the damper 112. The pressure tube 520 defines a first end (not shown) and a second end 524. The pressure tube 520 further defines at least one tube opening 532 at the second end 524 to fluidly communicate a compression chamber 534 with an intermediate chamber 536. More particularly, the second end 524 of the pressure tube 520 defined at the reduced-diameter section 528 is embodied as an open end of the pressure tube 520. The at least one tube opening 532 creates a fluid passageway between the intermediate chamber 536 and an additional chamber 452 in order to fluidly communicate the compression chamber 534 with the intermediate chamber 536. Further, the damper 500 includes a primary piston 538 and a secondary piston 546 similar to the primary piston 138 and the secondary piston 146 of the damper 112. The primary piston 538 defines a rebound chamber 540 and the compression chamber 534 within the pressure tube 520. Further, the additional chamber 552 is defined on another side of the secondary piston 546.

The damper 500 includes a sleeve 560 similar to the sleeve 160 of the damper 112. The sleeve 560 is connected to the primary section 526 of the pressure tube 520 adjacent to a tapered section 530. The sleeve 560 is connected to the primary section 526 by welding thereby eliminating need for a new cylinder end and base cup design. Further, the damper 500 includes a base valve 562 similar to the base valve 162 of the damper 112. The base valve 562 may operates in an open position during a compression stroke and may be in a closed position during a rebound stroke of the damper 500. A design of the damper 500 allows usage of same size of the base valve 562 as a diameter of the pressure tube 520. The base valve 562 may include an assembly of valves. For example, the base valve 562 may include a pair of unidirectional valves, such as non-return valves, that are operational during the rebound stroke and the compression stroke, respectively. The base valve 562 may therefore include a pair of check valves. Further, the base valve 562 may include a pair of variable flow control valves that are operational during the rebound stroke and the compression stroke, respectively.

During the rebound stroke, the primary and secondary pistons 538, 546 travel towards the first end. When the primary and secondary pistons 538, 546 travel towards the first end, a volume of the compression chamber 534 increases. Thus, an additional flow of fluid is directed to the compression chamber 534 to compensate for the increase in the volume of the compression chamber 534. Additionally, as a volume of the rebound chamber 540 decreases, some amount of the fluid from the rebound chamber 140 flows towards a reserve chamber 572 via an opening 570. The damper 500 may include a valve assembly (not shown) that provides fluid communication between the reserve chamber 572 and an external fluid reservoir (not shown), such as an accumulator. In such examples, the valve assembly may regulate a flow of fluid between the reserve chamber 572 and the external fluid reservoir. The valve assembly may be electronically controlled by the controller 121.

Further, the compression chamber 534 may receive a portion of the fluid from the rebound chamber 540 through the first primary piston valve 542. More particularly, based on the movement of the primary and secondary pistons 538, 546 towards the second end 524, a small portion of the fluid in the rebound chamber 540 flows from the rebound chamber 540 towards the compression chamber 534 via a first primary piston valve 542. The first primary piston valve 542 is similar to the first primary piston valve 142 of the damper 112. The first primary piston valve 542 may be in an open position during the rebound stroke of the damper 500 to control rebound damping characteristics of the damper 500. In examples, a degree of opening of the first primary piston valve 542 may be regulated to adjust the rebound damping characteristics of the damper 500.

Further, during the rebound stroke, a second primary piston valve 544 is operable to prevent fluid flow therethrough in response to the motion of the primary and secondary pistons 538, 546 towards the first end. More particularly, the second primary piston valve 544 may be in a closed position during the rebound stroke of the damper 500. The second primary piston valve 544 is similar to the second primary piston valve 144 of the damper 112.

During the compression stroke, when the primary and secondary pistons 538, 546 travel towards the second end 524, the volume of the rebound chamber 540 increases, whereas the volume of the compression chamber 534 and the additional chamber 552 decreases. More particularly, as the primary and secondary pistons 538, 546 travel towards the second end 524 and the secondary piston 546 enters the reduced-diameter section 528, the compression chamber 534 is defined partially by the primary section 526 and partially by the reduced-diameter section 528. Further, a portion of the fluid flows from the reserve chamber 572 towards the rebound chamber 540 via the opening 570 in order to compensate for the increase in the volume of the rebound chamber 540. In such examples, the valve assembly may regulate a flow of fluid from the external fluid reservoir towards the reserve chamber 572.

Further, a volume of the additional chamber 552 also decreases as the secondary piston 546 enters the narrow section 128. Thus, fluid from the additional chamber 552 is directed towards the compression chamber 534 via a secondary piston valve 548 that is disposed in the secondary piston 546. Path "P4" depicts the fluid flow from the additional chamber 552 towards the compression chamber 534. The secondary piston valve 548 is similar to the secondary piston valve 148 of the damper 112.

Further, the base valve 562 is in the open position during the compression stroke to allow a portion of the fluid from the intermediate chamber 536 to flow towards the reserve chamber 572. Path "P5" depicts the fluid flow from the intermediate chamber 536 towards the reserve chamber 572. In some examples, a degree of opening of the base valve 562 may be regulated to adjust the compression damping characteristics of the damper 500. Additionally, during the compression stroke, a small portion of the fluid from the compression chamber 534 may enter into the rebound chamber 540 via the second primary piston valve 544 to regulate pressure in the rebound chamber 540. In some examples, a degree of opening of the second primary piston valve 544 may be regulated to adjust the compression damping characteristics of the damper 500. The damper 500 described above may include fewer components and may eliminate fluid bypass towards the intermediate chamber 536.

Further, the dampers 112, 400, 500 described above may provide improved damping and may include cost effective components as compared to conventional dampers including HCS cups. Further, the dampers 112, 400, 500 may eliminate the requirement of a separate HCS cup and may also provide improved stroke flexibility of the secondary piston 146, 546. Additionally, the neck down region may control an extent of travel of the secondary piston 146, 546 while providing additional damping.

The design of the HCS arrangement associated with the dampers 112, 400, 500 explained above includes simplified construction and is easy to manufacture. Further, the HCS arrangement described above may be incorporated in the dampers at a lower cost as compared to existing HCS arrangements. Additionally, an application of the dampers 112, 400, 500 described herein is not restricted to vehicles and may be used in any application that incorporates a damper.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A damper comprising:
   a pressure tube defining a first end and a second end opposite to the first end, the pressure tube comprising a primary section extending from the first end and a reduced-diameter section extending from the second end, wherein a diameter of the reduced-diameter section is less than a diameter of the primary section, the pressure tube further comprising a plug disposed at the second end of the pressure tube, and a plug valve disposed in the plug;
   a primary piston slidably disposed within the pressure tube, the primary piston defining a rebound chamber and a compression chamber within the pressure tube;
   a secondary piston movable with the primary piston, wherein a diameter of the secondary piston is less than a diameter of the primary piston, and wherein the secondary piston is slidable within the reduced-diameter section;
   a sleeve connected to the pressure tube and surrounding the reduced-diameter section, the sleeve defining a first sleeve end disposed proximal to the pressure tube and a second sleeve end opposite to the first sleeve end; and
   a base valve disposed at the second sleeve end,
   wherein the pressure tube and the sleeve define an intermediate chamber therebetween, and wherein the pressure tube further defines at least one tube opening to fluidly communicate the compression chamber with the intermediate chamber.

2. The damper of claim 1, further comprising a reserve tube disposed around the pressure tube and the sleeve.

3. The damper of claim 1, wherein the pressure tube further comprises a tapered section disposed between the primary section and the reduced-diameter section.

4. The damper of claim 3, wherein the sleeve is connected to the primary section of the pressure tube adjacent to the tapered section.

5. The damper of claim 3, wherein the at least one tube opening is disposed in the tapered section.

6. The damper of claim 1, wherein the at least one tube opening is disposed in the reduced-diameter section.

7. The damper of claim 1, further comprising a secondary piston valve disposed in the secondary piston.

8. The damper of claim 1, further comprising an elongate post connecting the primary piston to the secondary piston.

9. A damper comprising:
   a pressure tube defining a first end and a second end opposite to the first end, the pressure tube comprising a primary section extending from the first end and a reduced-diameter section extending from the second end, wherein a diameter of the reduced-diameter section is less than a diameter of the primary section;
   a primary piston slidably disposed within the pressure tube, the primary piston defining a rebound chamber and a compression chamber within the pressure tube;
   a secondary piston movable with the primary piston, wherein a diameter of the secondary piston is less than a diameter of the primary piston, and wherein the secondary piston is slidable within the reduced-diameter section;
   a sleeve connected to the pressure tube and surrounding the reduced-diameter section, the sleeve defining a first sleeve end disposed proximal to the pressure tube and a second sleeve end opposite to the first sleeve end; and
   a base valve disposed at the second sleeve end,
   wherein the pressure tube and the sleeve define an intermediate chamber therebetween, and wherein the pressure tube further defines at least one tube opening to fluidly communicate the compression chamber with the intermediate chamber, wherein the at least one tube opening is disposed at the second end of the pressure tube.

10. The damper of claim 9, wherein the pressure tube further comprises a tapered section disposed between the primary section and the reduced-diameter section.

11. A damper comprising:
    a pressure tube defining a first end and a second end opposite to the first end, the pressure tube comprising a primary section extending from the first end, a reduced-diameter section extending from the second end, and a tapered section disposed between the primary section and the reduced-diameter section, wherein a diameter of the reduced-diameter section is less than a diameter of the primary section, the pressure tube further comprising a plug disposed at the second end of the pressure tube and a plug valve disposed in the plug;
    a primary piston slidably disposed within the pressure tube, the primary piston defining a rebound chamber and a compression chamber within the pressure tube;
    a secondary piston movable with the primary piston, wherein a diameter of the secondary piston is less than a diameter of the primary piston, and wherein the secondary piston is slidable within the reduced-diameter section;
    a sleeve connected to the pressure tube and surrounding the reduced-diameter section, the sleeve defining a first sleeve end disposed proximal to the pressure tube and a second sleeve end opposite to the first sleeve end; and
    a base valve disposed at the second sleeve end,
    wherein the pressure tube and the sleeve define an intermediate chamber therebetween, and wherein at least one of the reduced-diameter section and the tapered section of the pressure tube defines at least one tube opening to fluidly communicate the compression chamber with the intermediate chamber.

12. The damper of claim 11, further comprising a reserve tube disposed around the pressure tube and the sleeve.

13. The damper of claim 11, wherein the sleeve is connected to the primary section of the pressure tube adjacent to the tapered section.

14. The damper of claim 11, further comprising a secondary piston valve disposed in the secondary piston.

15. The damper of claim 11, further comprising an elongate post connecting the primary piston to the secondary piston.

\* \* \* \* \*